United States Patent Office 3,012,036
Patented Dec. 5, 1961

3,012,036
TAENIACIDAL AGENTS AND MEANS OF PRODUCING THE SAME
Frank H. Tendick, Grosse Pointe Park, Paul E. Thompson, Grosse Pointe Farms, and Edward F. Elslager, St. Clair Shores, Mich., assignors to Parke, Davis & Company, Detroit, Mich., a corporation of Michigan
No Drawing. Filed Dec. 5, 1958, Ser. No. 778,323
4 Claims. (Cl. 260—279)

This invention relates to novel taeniacidal agents and to means of producing the same. In particular, the invention relates to taeniacidal agents of the acridine series, more specifically, 3,6-dichloro-9-[epsilon-(1-piperidino)-amylamino]acridine and acid addition salts thereof.

Heretofore, the related acridine quinacrine has been considered to be one of the most effective agents for the treatment of tapeworm infestation. It has now been found that the mentioned compounds of the invention are four to eight times as effective as quinacrine, in regard to tolerance and taeniacidal activity, in combating intestinal infestation by the commonly occurring tapeworm *Hymenolepis nana*. Hence, one of the advantages of the invention is that there is a greater margin of safety, in the use of the instant compounds, between the effective dose and the maximum tolerated dose. The invention contemplates, as indicated, the mentioned acridines not only in free base form but also in acid addition salt form, and it includes salts of organic and inorganic acids among which there may be mentioned, by way of illustration, the hydrochloride, hydrobromide, sulfate, phosphate, sulfamate, sulfonate, acetate, lactate, tartrate, gluconate, pamoate, citrate, cresotinate, salicylate, benzoate, naphthoate and like salts. The invention includes acid addition salts generally and is not limited to salts with non-toxic acids inasmuch as those salts in which the acid moiety is per se too toxic for oral ingestion can without undue inconvenience be converted to the free base or non-toxic acid addition salt form in either of which latter forms the compounds can be safely administered. Acid addition salts of the instant acridines can be prepared by adding at least one equivalent of the desired acid to a solution of the free base, preferably under anhydrous conditions at room temperature with a solvent such as chloroform, ethanol, isopropanol and the like. Conversely, the free base can be obtained by neutralizing an aqueous or alcoholic solution of the salt with a basic agent such as ammonia, an alkali metal or alkaline earth metal hydroxide or carbonate or the like.

The instant acridines are produced in accordance with the invention by condensing 3,6,9-trichloroacridine with epsilon-(1-piperidino)amylamine, conveniently at elevated temperature, i.e. about 75° C. or higher and preferably in the presence of an excess of phenol. The reaction proceeds satisfactorily merely by contacting the reactants in the presence or absence of a solvent. If desired, an anhydrous inert organic solvent such as dioxane, petroleum ether and the like may be employed. Conveniently, the reactants are employed in equivalent quantity, but if desired an excess of either reactant can be used. The reaction product can be isolated from the reaction mixture as the free base after neutralization or, after extraction of the neutralized mixture with ether, as the acid addition salt of the base upon acidifying the dried extract and filtering the precipitated salt.

The acridines of the invention also are produced by condensing 4-chloro-N-(m-chlorophenyl)anthranilic acid chloride with epsilon-(1-piperidino)amylamine and cyclizing the resulting amide with a cyclizing agent such as phosphorous oxychloride. The reaction is conveniently carried out in an anhydrous inert organic solvent at reflux temperature. The relative proportion of the reactants is not critical and can be varied widely. It is ordinarily satisfactory to employ approximately equivalent quantities of the reactants but in the case of the cyclizing agent an excess up to four equivalents is preferred.

The invention is illustrated by the following examples.

Example 1

11.3 grams of 4-chloro-N-(m-chlorophenyl)anthranilic acid is suspended in 85 ml. of ligroin and treated with 9.1 g. of phosphorous pentachloride, boiling under reflux for 30 minutes after complete solution. The solution is chilled and the 4-chloro-N-(m-chlorophenyl)anthranilic acid chloride which separates is collected, re-dissolved in fresh ligroin, filtered and crystallized.

10.6 grams of the acid chloride is dissolved in 150 ml. of dry benzene and treated with 6.8 g. of ε-(1-piperidino)-amylamine in 100 ml. of dry benzene. The reaction mixture is refluxed for 40 minutes. 21.9 grams of phosphorous oxychloride is slowly added with stirring and the mixture heated to reflux for 7 hours. The mixture is then cooled, the benzene layer decanted, the residue taken up in 125 ml. of boiling absolute ethanol and the solution cooled and diluted with 3 volumes of ether. After chilling, the precipitate is collected and recrystalized from methanol and acetone. The product is collected and stirred into 500 ml. of water at room temperature. The hazy solution is filtered clear, precipitated with excess ammonium hydroxide, and extracted with chloroform. The chloroform extract is washed, dried over solid potassium carbonate and evaporated to a dry solid residue. The free base product, 3,6-dichloro-9-[ε-(1-piperidino)amylamino]-acridine, is taken up in ether and converted to the dihydrochloride salt by treatment with excess hydrogen chloride, and recrystallization twice from methanol upon dilution with four volumes of acetone; M.P. 278–279° C. with decomposition.

To obtain the corresponding sulfate salt a solution of 10 g. of the free base in ether is treated with an excess of concentrated sulfuric acid and the resulting precipitate is collected by filtration and dried. The product is 3,6-dichloro-9-[ε-(1-piperidino)amylamino]-acridine sulfate.

The starting material, 4-chloro-N-(m-chlorophenyl)-anthranilic acid can be prepared by the following procedure: 191 g. of 2,4-dichlorobenzoic acid, 159 g. of m-chloroaniline, 138 g. of anhydrous potassium carbonate, 5 g. of copper powder and 750 ml. of dry amyl alcohol is mixed and heated at reflux with stirring for 5 hours. 70 grams of potassium hydroxide in 50 ml. of water is added and the mixture steam distilled. The aqueous residue is filtered hot and made slightly acid with concentrated hydrochloric acid. After cooling, the precipitate is collected, washed successively with water, petroleum ether and finally water. The damp filter cake is mixed with 300 ml. of ethanol, digested on a steam bath a few minutes, cooled, and filtered. The filter cake is washed with petroleum ether, dried, and recrystallized from monochlorobenzene; M.P. 198–199° C.

Example 2

3,6,9-trichloroacridine (9.3 g.), 5.7 g. of epsilon-(1-piperidino)amylamine and 25 g. of phenol are heated at 110° C. for three hours, cooled, and diluted with 200 ml. of acetone containing 20 ml. of concentrated hydrochloric acid. The resulting precipitate is isolated by decantation of the supernatant liquid. The product is dissolved in water, the solution is filtered and the filtrate treated with excess ammonium hydroxide. The mixture is extracted with chloroform, the extracts dried and the chloroform removed under vacuum. The residual product, 3,6 - dichloro-9-[epsilon-(1-piperidino)amylamino]-acridine, is converted to the corresponding pamoate salt by treating an ethanol solution thereof with an ethanol solution containing one equivalent of pamoic acid [4,4'-methylene bis(3-hydroxy-2-naphthoic acid)].

The corresponding salicylic acid salt can be prepared by treating an ether solution of the acridine base with an ether solution containing two equivalents of salicylic acid. The solution is chilled for several hours and the resulting yellow product, 3,6-dichloro-9-[-epsilon-(1-piperidino)-amylamino]acridine disalicylate, is recovered by filtration.

What is claimed is:

1. A compound of the class consisting of 3,6-dichloro-9-[epsilon-(1-piperidino)amylamino]acridine and physiologically acceptable acid addition salts thereof.

2. 3,6 - dichloro-9-[epsilon-(1-piperidino)amylamino]-acridine.

3. The product of claim 2 in physiologically acceptable acid addition salt form.

4. 3,6 - dichloro-9-[epsilon-(1-piperidino)amylamino]-acridine, dihydrochloride.

References Cited in the file of this patent

UNITED STATES PATENTS 2,113,357    Mietzsch et al. _____ Apr. 5, 1938

OTHER REFERENCES

Spalding et al.: J. American Chemical Society, vol. 68, pages 1596–1598 (1946).

Wiselogle: Survey of Anti-malarial Drugs, vol. II, part II, page 1347 (1946).

Patel et al.: J. Indian Chem. Soc., vol. 32 (1955), pp. 770–772.